Oct. 20, 1925.
F. B. NEWELL
1,557,867
GASOLINE LEVEL GAUGE
Filed Oct. 24, 1923
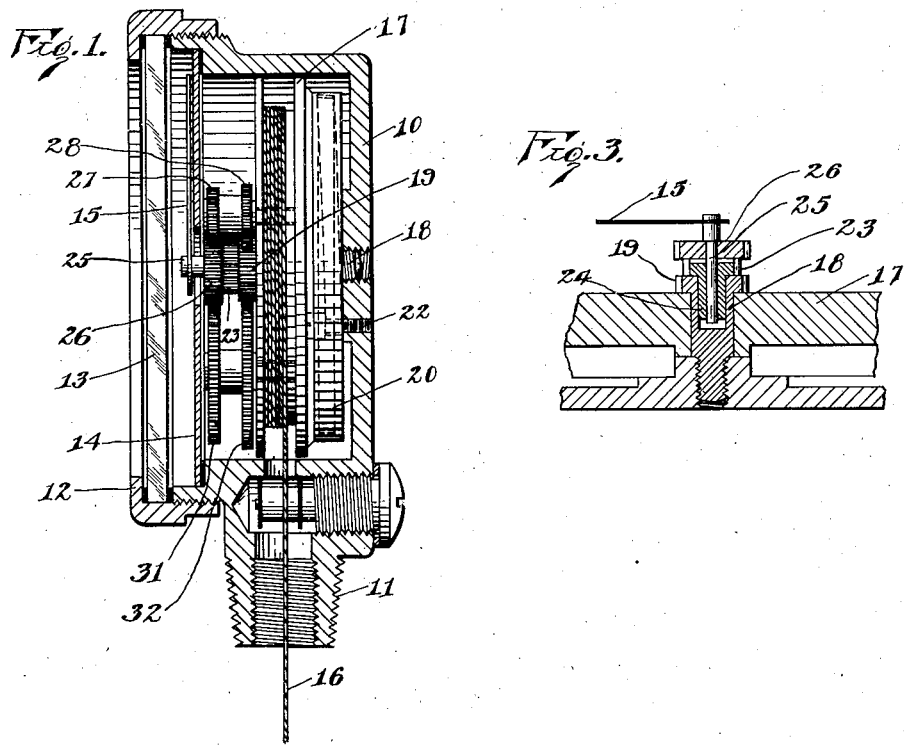
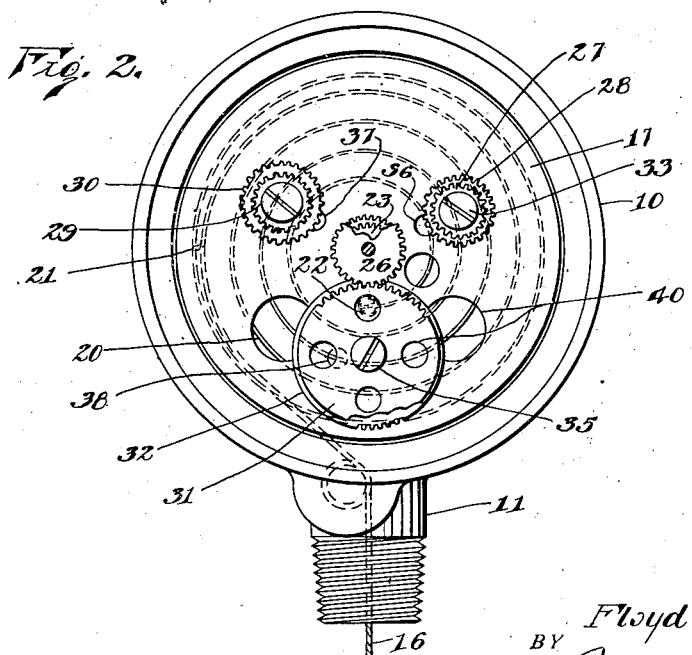
INVENTOR
Floyd B. Newell
BY
Robert A. Young
ATTORNEY Patented Oct. 20, 1925.

1,557,867

UNITED STATES PATENT OFFICE.

FLOYD B. NEWELL, OF DAYTON, OHIO.

GASOLINE-LEVEL GAUGE.

Application filed October 24, 1923. Serial No. 670,501.

*To all whom it may concern:*

Be it known that I, FLOYD B. NEWELL, a citizen of the United States, residing at Dayton, in the county of Montgomery and State of Ohio, have invented certain new and useful Improvements in Gasoline-Level Gauges, of which the following is a specification.

This invention relates to gauges generally but is more particularly concerned with a gauge for indicating the level of gasoline or the like in tanks, the gauge being capable of settings to adapt the same to use with tanks of different capacities.

The principal object of the invention is to provide a gauge of a generally standard construction, but having gears or any other means of mechanical connection for the index member of the gauge which can be changed to different settings with very little difficulty to vary the amount of movement of the index member incident to a given change in level of the gasoline, so that the gauge when properly set will indicate accurately the change in level in different sized tanks.

Referring to the drawing, wherein is illustrated a gauge embodying my invention, Fig. 1 is a central vertical section of the gauge, the mechanism inside being shown in elevation.

Fig. 2 is an elevational view of the inside of the gauge, the cap, dial and index hand having been removed to disclose the interior of the gauge.

Fig. 3 is a fragmentary enlarged sectional detail of the index hand-carrying gear and the central stationary planetary gears with which the same cooperates in the operation of the gauge. The same reference numerals are applied to the same parts in the three views.

The gauge is generally of a standard well known construction comprising a casing 10 having a threaded neck 11 for connection with a gasoline tank or the like, it being customary in airplane practice to carry the gauge directly upon the tank. The casing is open at the front and has a threaded cap 12 with a sight glass 13 therein to close the same. Through the glass 13 may be seen the dial 14 with respect to which an index hand 15 moves from a "full" point to an "empty" point, past suitable intermediate indicia as ¾, ½ and ¼, indicating the amount of fuel in the tank.

The index hand is operated by a float (not shown) on the end of a cord 16 as the float is raised or lowered in the filling or emptying of the tank. The cord 16 passes over an anti-friction roller in the neck 11 and winds on a drum 17 inside the casing. The drum is rotatably mounted on the shank 18 of a small gear 19, which is one of a plurality of planetary gears to be presently described.

The shank 18 threads into the rear wall of the casing 10 as shown. The drum 17 is normally constrained to turn and wind up the cord 16 by a light torsion spring 20, which has one end fast to the drum as at 21 and is rigidly secured to the casing 10 at its other end by a post 22, threaded into the rear wall of the casing as shown.

The spring 20 has only sufficient tension, it is understood, to turn and take up the slack in the cord 16 as the float is raised in the filling of the tank and is light enough to allow the cord 17 to be paid out as the float drops lower and lower as the fuel in the tank is consumed. The structure thus far described will be recognized to be a standard and well known construction. No invention is, of course, claimed therein except only in so far as it contributes to the novel combination to be set forth further hereinafter.

The gear 19 has coaxial and rigid with it another smaller gear 23, the shank 24 of which has a press fit in a recess extending into the shank 18 of the gear 19. The gear 23 and its shank are centrally bored to rotatably receive a spindle 25 having the index hand 15 on its outer end. The spindle 25 has a press fit in a gear 26 coaxial with and slightly larger than the gears 19 and 23.

Mounted on the disc 17 are three double planetary gear sets comprising small gears 27 and 28, intermediate sized gears 29 and 30, and large gears 31 and 32, the several sets of two each being rigid and mounted rotatably on studs 33, 34 and 35, respectively. Each of the studs is arranged to occupy either of two positions threaded in either of two openings provided therefor in the drum 17, in one of which positions the gears carried thereby are in inoperative position out of mesh with any of the central gears 19, 23 and 26, while in the other position the gears are in mesh to operate the index hand 15 in the rotation of the drum 17. In Fig. 2, both studs 33 and 34 have been removed from openings 36 and 37 and threaded in openings farther removed from the gears 19, 23, and 26 to remove the gears carried thereby from operative engagement, while the stud 35 is positioned so that the gears 31 and 32 mesh with gears 26 and 19, respectively.

In the operation of the gauge, the rotation of the drum 17 carries the gears thereon around in circular orbits. The gears 31 and 32 in such rotation of the drum are turned about the stud 35 as an axis by virtue of the meshing of gear 32 with the rigid gear 19. The gear 31 being smaller than the gear 32 and meshing with the gear 26 turns the latter through a certain angularity as a result of the differential. These gears are adapted for use with rather small tanks where the float movement is slight, say up to 12 inches. When it is desired to use the gauge on a larger tank, the stud 35 may be removed and threaded into an opening 38 farther removed from the gears 19, 23 and 26 to remove the gears 31 and 32 from operative engagement with the gears 19 and 26.

The gears 27 and 28, when the stud 33 is threaded in opening 36 mesh with gears 26 and 19, respectively, and operate likewise as planetary gears in the turning of the drum 17 to move the index hand 15. The other sets of gears are of course in inoperative position when the gears 27 and 28 are placed in operative position. These gears are designed to be used when the gauge is fitted to a tank of an intermediate size where the float has a movement of say 12" to 36".

The gears 29 and 30 are similarly placed in mesh with gears 26 and 23 respectively, when the stud 34 is threaded in opening 37, the other sets of gears being of course out of mesh with the central gears. These gears are designed to be used when the gauge is fitted to a tank of a large size where the float movement is say 36" to 54".

The provision of the several sets of planetary gears circumferentially arranged on the drum 17 requires the making of lightening holes 40 adjacent the large gears 31 and 32 because of the greater weight of these gears than the other gears. The holes are so located as to balance the drum so that it will not operate unevenly and destroy the accuracy of the gauge.

The invention although disclosed in connection with a specific type of gauge and utilizing one form of a variable mechanical connection, such as the change gears illustrated, is not, of course, to be understood as limited to the particular kind of gauge shown nor to the particular change gearing.

I claim:—

1. The combination in a gauge, of an index member, an actuated element, and variable transmission for operatively connecting said index member and said actuated element.

2. The combination in a gauge, of an index member, a gear for operating the same, a plurality of gears of different sizes for operating said index gear, any one of said gears being placed in mesh with said index gear at a time, and an actuated element for operating said index member through said gears.

3. The combination in a gauge, of an index member, a gear for operating the same, a disc rotatable in the operation of said gauge and planetary gears of different sizes mounted on said disc to operate in circular orbits in the rotation of said disc and movable selectively into meshing engagement separately with said index gear.

4. In a gauge comprising a casing, a disc rotatable therein in the operation of said gauge, a central gear rigid in said casing, and an index hand-carrying gear coaxial with an rotatable relative to said first-mentioned gear, a plurality of double planetary gears of different sizes movably secured on said disc arranged to be selectively meshed with each of said other gears to change the driving ratio between said disc and said index gear.

5. The combination in a gauge, of an index member, an actuated member, and means providing a mechanical connection between said index member and said actuated member to produce proportional movements of said index member with the movements of said actuated member, said means being capable of setting to change the proportional movement of one member with respect to the other.

6. The combination in a depth gauge of an index member, an actuated member movable upon the rise and fall of a float with the level of a liquid in a tank, and change gears for operatively connecting said actuated member with said index member to be set so that a given movement of said actuated member produces different movements of said index member in different sized tanks.

7. The combination in a gauge, of an index member, a gear for operating the same, a disc rotatable in the operation of said gauge and planetary gears of different sizes and weights mounted on said disc to operate in circular orbits in the rotation of said disc to operate said index gear, said disc having lightening holes therein adjacent the large heavy gears to balance the disc for its rotary movement.

8. A level indicating gauge comprising a casing, a pinion having a shank fixed to said casing, a pointer pinion rotatably mounted on said fixed pinion shank, a cord-operated drum revolubly mounted on said fixed pinion shank, and a plurality of groups of planetary gears adjustably mounted on said cable drum for meshing at will with said fixed pinion and said pointer pinion.

9. A fractional level indicating instrument for a plurality of various sized tanks, comprising a casing, a fixed pinion mounted in said casing, a pointer pinion rotatably mounted on the fixed pinion mounting, a cord-operated drum also rotatable on said fixed pinion mounting, and, a plurality of planetary gear sets adjustably mounted in spaced openings in said rotatable drum, any one of said sets of planetary gears being adapted to mesh with the fixed and pointer pinions as desired.

In testimony whereof I affix my signature.

FLOYD B. NEWELL.